United States Patent
Chou et al.

(10) Patent No.: US 8,292,672 B2
(45) Date of Patent: Oct. 23, 2012

(54) FLASH MEMORY DEVICE AND ASSEMBLY THEREOF WITH IMPROVED PLANAR CONTACT PORTIONS

(75) Inventors: Tsu-Liang Chou, Chung Ho (TW);
Cheng-Fu Yau, Chung Ho (TW);
Wei-Jen Cheng, Chung Ho (TW);
Yu-Cheng Kang, Chung Ho (TW);
Mei-Chih Chen, Chung Ho (TW);
Ming-Ta Yang, Chung Ho (TW)

(73) Assignee: A-Data Technology (Suzhou) Co., Ltd., Suzhou, Jiangsu Province (CN)

( * ) Notice: Subject to any disclaimer, the term of this patent is extended or adjusted under 35 U.S.C. 154(b) by 0 days.

(21) Appl. No.: 12/796,873

(22) Filed: Jun. 9, 2010

(65) Prior Publication Data
US 2011/0092109 A1    Apr. 21, 2011

(30) Foreign Application Priority Data
Oct. 15, 2009   (TW) .............................. 98134857 A

(51) Int. Cl.
*H01R 24/00*     (2011.01)

(52) U.S. Cl. ..................................................... 439/660
(58) Field of Classification Search ................. 439/660, 439/76.1, 676; 361/737; 235/492
See application file for complete search history.

(56) References Cited

U.S. PATENT DOCUMENTS

| 7,440,286 | B2 * | 10/2008 | Hiew et al. ..................... 361/737 |
| 7,686,656 | B2 * | 3/2010 | Zheng et al. ................... 439/660 |
| 2009/0093136 | A1 | 4/2009 | Hiew et al. |
| 2011/0003514 | A1 * | 1/2011 | Nguyen et al. ................ 439/660 |

* cited by examiner

*Primary Examiner* — Phuong Dinh
(74) *Attorney, Agent, or Firm* — Cheng-Ju Chiang

(57) ABSTRACT

A flash memory device includes a Chip-On-Board (COB) type circuit board and a number of first and second contacts electrically connected to the circuit board. Each first contact includes a stiff first contact portion formed on an upper surface of the circuit board. Each second contact includes a cantilevered planar second contact portion extending along the front-to-rear direction. When the flash memory device is inserted into a USB 3.0 receptacle connector, the first and the second contact portions jointly electrically connect with the USB 3.0 receptacle connector. The planar second contact portions provide larger contacting area for mating with the corresponding contacts of the USB 3.0 receptacle connector.

2 Claims, 5 Drawing Sheets

FLASH MEMORY DEVICE AND ASSEMBLY THEREOF WITH IMPROVED PLANAR CONTACT PORTIONS

BACKGROUND OF THE INVENTION

1. Field of the Invention

The present invention relates to a personal computer peripheral device, and more particularly to a flash memory device and an assembly thereof with improved planar contact portions compatible to mate with USB 2.0 and USB 3.0 receptacle connectors.

2. Description of Related Art

With the fast development of the electrical domain, flash memory is currently used in variety of apparatus including digital cellular phone, digital camera, PC card, and digital setup box or inner controller for notebook computer. A flash memory device such as a U-disk is widely used as an intermedium for accessing data files from one device to another, or like a portable hard drive for installing data.

Usually, a flash memory device includes a circuit board with a plurality of electronic components, such as driver chip, memory chip, oscillator, resistor, etc. for saving and loading data, functioning as a miniature hard drive or wireless communication/transmission, a connector port connected to one end of the circuit board, and a cover enclosing the circuit board. In order to decrease profile of the flash memory device, a so-called Chip-On-Board (COB) IC packaging technology comes into being. Usually, a COB type circuit board includes an embedded chip and a plurality of golden fingers connected to the chip via a plurality of bonding wires.

Universal Serial Bus (USB) has been widely used as a standard connector port because of its self detection and hot plug etc. Nowadays, the most widely used USB ports measure up to USB specification version 2.0 and such USB connectors are accordingly called USB 2.0 connectors as shown in FIG. 1A. However, with the fast development of the information technologies, the current transmission speed of the USB 2.0 connectors can't meet higher demands. As a result, USB 3.0 connectors with transmission speed decouple faster than the USB 2.0 connectors come with the tide of fashion.

As shown in FIG. 1A, a USB 2.0 receptacle connector A1 includes four deformable contact sections A11 extending downwardly beyond a mating surface A12 thereof for mating with a corresponding USB 2.0 plug to transmit USB 2.0 signals.

As shown in FIG. 1B, a USB 3.0 receptacle connector A2 includes five front contact sections A22 and four rear contact sections A21 located behind the front contact sections A22. The front contact sections A22 are planar and recessed from a mating surface A23 of the USB 3.0 receptacle A2. The front contact sections A22 are disposed near a mating end A24 of the USB 3.0 receptacle A2. The rear contact sections A21 are of the same configuration as the contact sections A11 of the USB 2.0 receptacle connector A1 and protrude downwardly beyond the mating surface A23. The front and the rear contact sections A22, A21 jointly abut against a corresponding USB 3.0 plug to transmit USB 3.0 signals.

In the interim, USB 2.0 and USB 3.0 receptacle connectors are coexisted in the market, so there is a demand to provide USB flash memory devices which are compatible to USB 2.0 and USB 3.0 receptacle connectors.

BRIEF SUMMARY OF THE INVENTION

The present invention provides a flash memory device for insertion into USB 2.0 and USB 3.0 receptacle connectors. The flash memory device includes a Chip-On-Board (COB) type circuit board and a plurality of first and second contacts electrically connected to the circuit board. Each first contact includes a stiff first contact portion formed on an upper surface of the circuit board. The second contacts are located behind the first contact portions along a front-to-rear direction. Each second contact includes a mounting portion electrically connected to the circuit board, a cantilevered planar second contact portion extending along the front-to-rear direction, and a bridge connecting the second contact portion and the mounting portion. The second contact portions are parallel to and positioned above the first contact portions. When the flash memory device is inserted into the USB 2.0 receptacle connector, the second contact portions are driven to be downwardly deformable so that only the first contact portions electrically connect with the USB 2.0 receptacle connector. When the flash memory device is inserted into the USB 3.0 receptacle connector, the first and the second contact portions jointly electrically connect with the USB 3.0 receptacle connector.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1A:
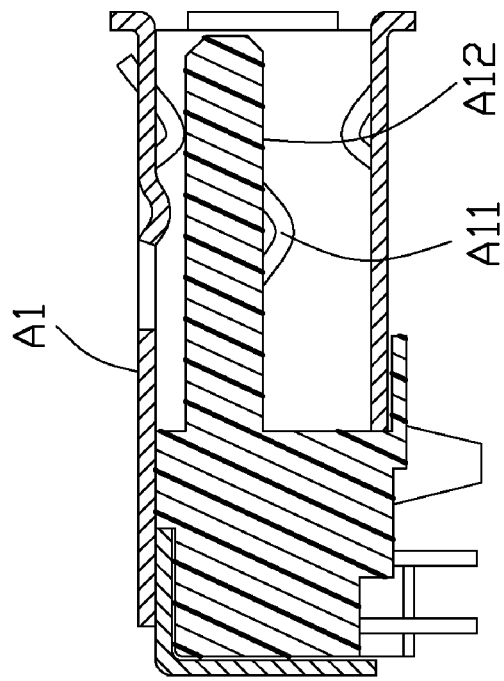
FIG. 1A is a schematic view of a prior art USB 2.0 receptacle connector.
Figure 1A:
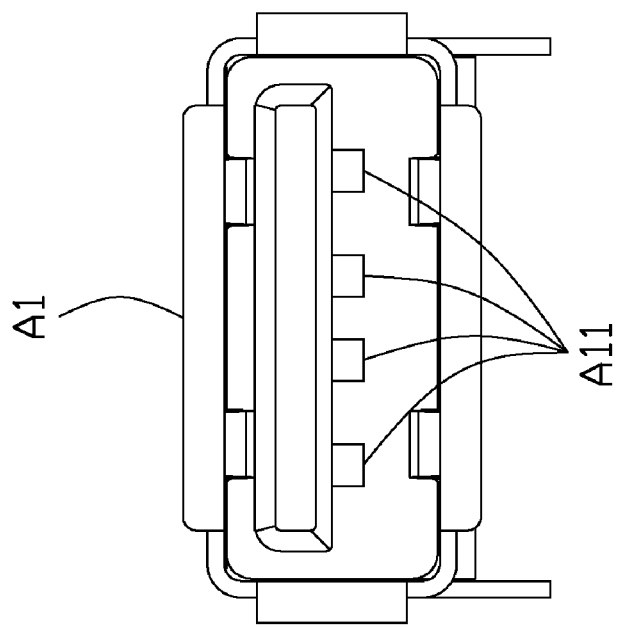
Figure 1B:
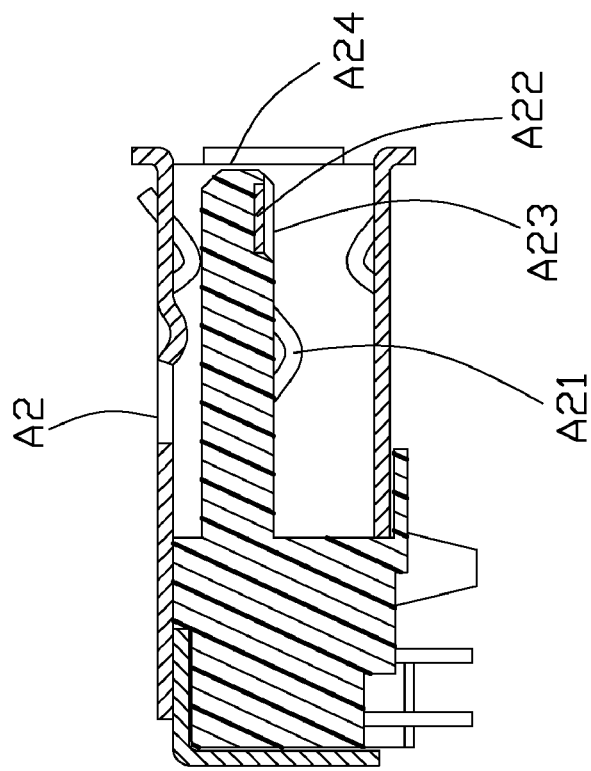
FIG. 1B is a schematic view of a prior art USB 3.0 receptacle connector.

Reference will now be made to the drawing figures to describe the embodiments of the present invention in detail. In the following description, the same drawing reference numerals are used for the same elements in different drawings.

Figure 2A:
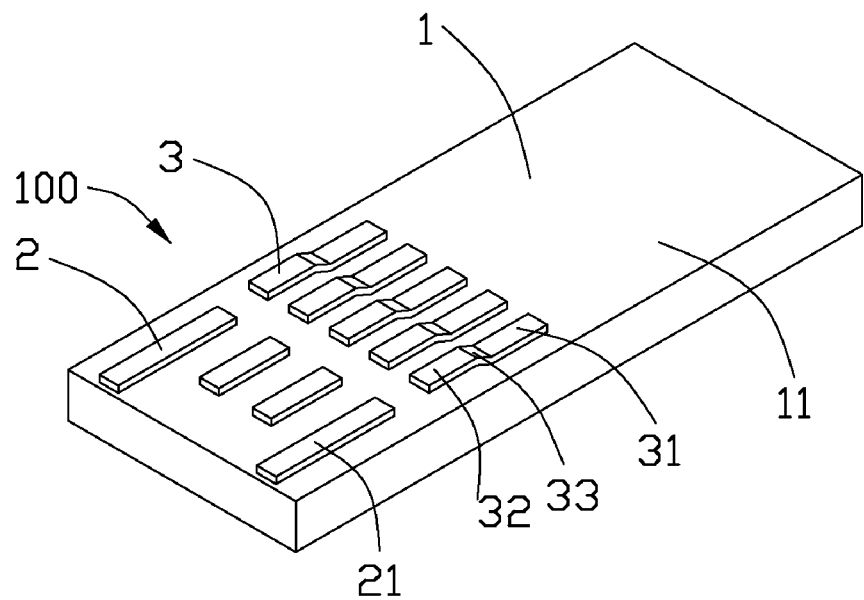
FIG. 2A is a perspective view of a flash memory device according to an embodiment of the present invention.
Figure 2B:
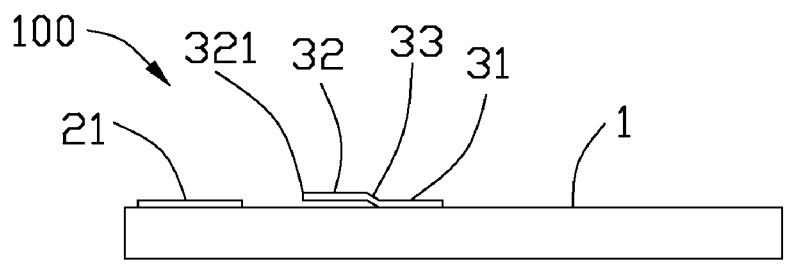
FIG. 2B is a side view of the flash memory device shown in FIG. 2A.

Referring to FIGS. 2A and 2B, a flash memory device 100 which can be used for data transmission with a host device according to an embodiment of the present invention is disclosed. The flash memory device 100 is compatible to USB standard and can be alternatively inserted into a USB 3.0 receptacle connector A2 or a USB 2.0 receptacle connector A1 for transmitting USB 3.0 signals or USB 2.0 signals, respectively. The flash memory device 100 includes a Chip-On-Board (COB) type circuit board 1 and a plurality of first and second contacts 2, 3 electrically connected to the circuit board 1.

The circuit board 1 is rectangular shaped and includes a chip (not shown) electrically connecting the first and the second contacts 2, 3. The first contacts 2 are compatible to USB 2.0 standard. Each first contact 2 includes a stiff first contact portion 21 formed on an upper surface 11 of the circuit board 1. The fabrication of the first contacts 2 includes forming a plurality of golden pads directly on the upper surface 11 of the circuit board 1. Alternatively, the first contacts 2 are manufactured by soldering a plurality of metal rectangular contacts to the circuit board 1. As shown in FIG. 2B, the first contact portion 21 extends upwardly beyond the upper surface 11 of the circuit board 1.

The second contacts 3 are located behind the first contact portions 21 along a front-to-rear direction. Each second contact 3 is Z-shaped and includes a mounting portion 31 electrically connected to the circuit board 1, a cantilevered planar second contact portion 32 extending forwardly along the front-to-rear direction, and a bridge 33 connecting the mounting portion 31 and the second contact portion 32. The mounting portions 31 are fixed to the upper surface 11 of the circuit board 1 through SMT. The second contact portions 32 are parallel to the mounting portions 31 under an arrangement that the mounting portions 31 extend backwardly from the bridges 33 and the second contact portions 32 extend forwardly from the bridges 33. As shown in FIG. 2B, the mounting portions 31 are coplanar with the first contact portions 21 of the first contacts 2. The second contact portions 32 are spaced apart from the upper surface 11 of the circuit board 1 along a vertical direction perpendicular to the front-to-rear direction. A distal end 321 of each second contact portion 32 is disconnected with the upper surface 11 of the circuit board 1 so that the second contact portion 32 is deformable along the vertical direction.

Figure 3A:
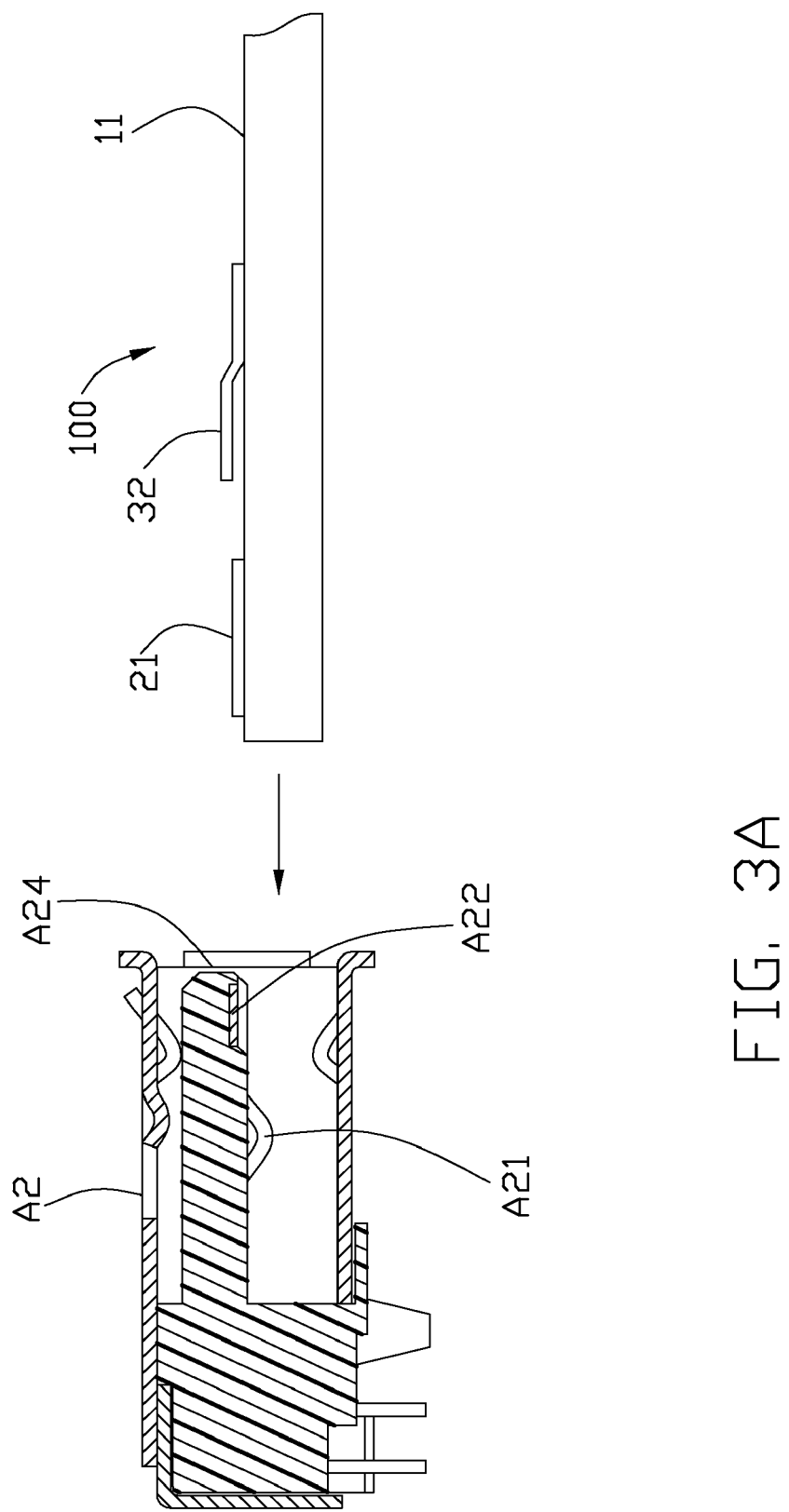
FIG. 3A is a schematic view of the flash memory device shown in FIG. 2A under a condition that the flash memory device is before insertion into the USB 3.0 receptacle connector.

As shown in FIG. 3A, when the flash memory device 100 is inserted into the USB 3.0 receptacle connector A2, the second contact portions 32 horizontally pass the mating end A24 of the USB 3.0 receptacle connector A2 for mating with the plurality of recessed front contact sections A22. With the flash memory device 100 fully inserted into the USB 3.0 receptacle connector A2, the first contact portions 21 engage with the corresponding rear contact sections A21, and the second contact portions 32 are attached to the corresponding front contact sections A22. Under this condition, the first and the second contact portions 21, 32 jointly abut against the corresponding contact sections A21, A22 of the USB 3.0 receptacle connector A2 for transmitting USB 3.0 signals. The planar second contact portions 32 provide larger contacting area for mating with the corresponding planar front contact sections A22.

Figure 3B:
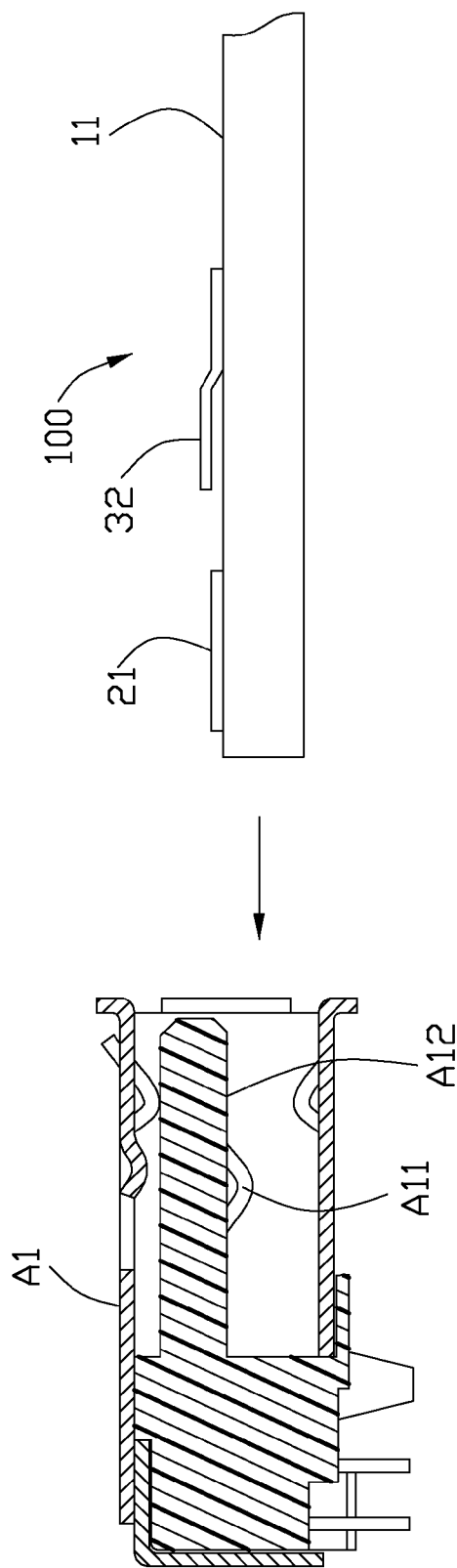
FIG. 3B is a schematic view of the flash memory device shown in FIG. 2A under a condition that the flash memory device is before insertion into the USB 2.0 receptacle connector.

However, as shown in FIG. 3B, when the flash memory device 100 is inserted into the USB 2.0 receptacle connector A1, the second contact portions 32 are driven to be downwardly deformable by the mating surface A12 of the USB 2.0 receptacle connector A1 because the second contact portions 32 extend above the first contact portions 21 and no recessed area is provided at the mating surface A12 of the USB 2.0 receptacle connector A1 for receiving the second contact portions 32. With the flash memory device 100 fully inserted into the USB 2.0 receptacle connector A1, the second contact portions 32 are pressed against by the mating surface A12 and only the first contact portions 21 abut against the contacts A11 of the USB 2.0 receptacle connector A1 for transmitting USB 2.0 signals. When the flash memory device 100 is removed from USB 2.0 receptacle connector A1, the pressed second contact portions 32 recover to their normal horizontal position.

It is to be understood, however, that even though numerous, characteristics and advantages of the present invention have been set forth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A flash memory device assembly, comprising:
a USB 3.0 receptacle connector having a plurality of front and rear contact sections, the front contact sections being planar and recessed from an mating surface of the USB 3.0 receptacle, the rear contact sections protruding beyond the mating surface; and
a flash memory device for being inserted into the USB 3.0 receptacle connector, the flash memory device comprising:
a circuit board;
a plurality of first contacts electrically connected to the circuit board, each first contact comprising a stiff first contact portion formed on an outer surface of the circuit board; and
a plurality of second contacts located behind the first contact portions along a front-to-rear direction, each second contact comprising a mounting portion electrically connected to the circuit board and a cantilevered planar second contact portion extending along the front-to-rear direction, the second contact portions being parallel to and positioned above the first contact portions under a condition that, when the flash memory device is inserted into the USB 3.0 receptacle connector, the first contact portions engage with the corresponding rear contact sections, and the second contact portions are attached to the corresponding front contact sections;
wherein the mounting portion is mounted on the outer surface of the circuit board and is coplanar with the first contact portion.

2. A flash memory device assembly, comprising:
a USB 3.0 receptacle connector having a plurality of front and rear contact sections, the front contact sections being planar and recessed from an mating surface of the USB 3.0 receptacle, the rear contact sections protruding beyond the mating surface; and
a flash memory device for being inserted into the USB 3.0 receptacle connector, the flash memory device comprising:
a circuit board;
a plurality of first contacts electrically connected to the circuit board, each first contact comprising a stiff first contact portion formed on an outer surface of the circuit board; and
a plurality of second contacts located behind the first contact portions along a front-to-rear direction, each second contact comprising a mounting portion electrically connected to the circuit board and a cantilevered planar second contact portion extending along the front-to-rear direction, the second contact portions being parallel to and positioned above the first contact portions under a condition that, when the flash memory device is inserted into the USB 3.0 receptacle connector, the first contact portions engage with the corresponding rear contact sections, and the second contact portions are attached to the corresponding front contact sections;
wherein each second contact is Z-shaped, wherein the mounting portion is mounted on the outer surface of the circuit board and is coplanar with the first contact portion.

\* \* \* \* \*